US012724652B2

(12) United States Patent
Lo

(10) Patent No.: US 12,724,652 B2
(45) Date of Patent: Sep. 1, 2026

(54) METHOD FOR MANAGING MUTUAL EXCLUSION ACCESS TO A CRITICAL SECTION IN A MULTI-CORE PROCESSOR

(71) Applicant: NATIONAL CHUNG CHENG UNIVERSITY, Chia-Yi (TW)

(72) Inventor: Shi-Wu Lo, Tainan City (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 18/788,860

(22) Filed: Jul. 30, 2024

(65) Prior Publication Data

US 2025/0362976 A1 Nov. 27, 2025

(30) Foreign Application Priority Data

May 27, 2024 (TW) ................................ 113119491

(51) Int. Cl.
*G06F 9/52* (2006.01)

(52) U.S. Cl.
CPC ..................................... *G06F 9/52* (2013.01)

(58) Field of Classification Search
CPC ...... G06F 9/52; G06F 2209/522; G06F 9/524; G06F 9/526
See application file for complete search history.

(56) References Cited

U.S. PATENT DOCUMENTS

| | | | | |
|---|---|---|---|---|
| 7,188,344 B1 * | 3/2007 | Blue | G06F 9/526 | 718/102 |
| 2007/0006232 A1 * | 1/2007 | Bliss | G06F 9/526 | 718/100 |
| 2007/0300226 A1 * | 12/2007 | Bliss | G06F 9/526 | 718/100 |
| 2012/0240126 A1 * | 9/2012 | Dice | G06F 9/526 | 718/104 |
| 2013/0290967 A1 * | 10/2013 | Calciu | G06F 9/526 | 718/102 |
| 2020/0134182 A1 * | 4/2020 | Ma | G06F 21/57 | |

FOREIGN PATENT DOCUMENTS

| | | |
|---|---|---|
| CN | 105205031 A | 12/2015 |
| TW | 200912643 A | 3/2009 |
| TW | 201600970 A | 1/2016 |
| TW | 201702882 A | 1/2017 |

OTHER PUBLICATIONS

Examination Report mailed to Corresponding Taiwanese Patent Application No. 113119491 dated Nov. 1, 2024.

* cited by examiner

*Primary Examiner* — Farley Abad
(74) *Attorney, Agent, or Firm* — Rosenberg, Klein & Lee

(57) ABSTRACT

In a method for managing mutual exclusion access to a critical section in a multi-core processor, the multi-core processor includes cores. The step of managing the cores to access a critical section by the multi-core processor includes only one of the cores is allowed to access the critical section at given time and the next thread on the core that is allowed to access the critical section for accessing the critical section is designated.

19 Claims, 5 Drawing Sheets

METHOD FOR MANAGING MUTUAL EXCLUSION ACCESS TO A CRITICAL SECTION IN A MULTI-CORE PROCESSOR

BACKGROUND OF THE INVENTION

This application claims priority for the TW application No. 113119491 filed on 27 May 2024, the content of which is incorporated by reference in its entirety.

FIELD OF THE INVENTION

The present invention relates to a method for managing mutual exclusion access to a critical section in a multi-core processor, particularly to a method for managing threads to access a critical section in a multi-core processor.

DESCRIPTION OF THE RELATED ART

According to Wikipedia, a critical section refers to a segment of code that accesses shared resources (such as shared devices or shared memory) which cannot be accessed by multiple threads simultaneously. Therefore, when multiple threads compete for the same critical sections (CS), traditional synchronized lock methods can lead to performance bottlenecks, especially on multi-core processors. When a thread holds a synchronized lock to access a critical section, all other threads that need the same lock must wait, causing them to be idle when waiting for the lock to be released. During this waiting period, threads consume the cycles of a multi-core processor on ineffective spinning rather than performing useful work. This spinning not only wastes processor resources but also potentially reduces energy efficiency.

In terms of the non-uniform memory access (NUMA) mechanism, memory access time depends on the data's location in physical memory, which can lead to performance degradation. Additionally, in traditional spinlock mechanisms, some threads might acquire the lock earlier than others, resulting in prolonged waiting time for some threads and causing fairness issues. Furthermore, when the number of threads increases, traditional spinlocks require a large number of spin loops to acquire the lock, leading to significant performance degradation.

In summary, the issues with traditional multi-threaded lock usage include performance bottlenecks, resource wastage, performance degradation, and lack of fairness. Therefore, when providing a balance between fairness and performance, finding a solution to the fair competition and scheduling of excessive threads for accessing the synchronized locks of critical sections is an issue that needs to be addressed.

SUMMARY OF THE INVENTION

In order to overcome the conventional problems, an objective of the invention is to manage the number of waiting threads and the synchronized lock state on each core and use atomic operations to ensure lock acquisition and released atomicity, thereby improving the efficiency and fairness of managing synchronized locks on a multi-core processor and enhancing overall performance.

According to the present invention, a method for managing mutual exclusion access to a critical section in a multi-core processor that the multi-core processor processing managing comprises: using a multicore-lock-unlock module that permits only one of the cores of the multi-core processor to access a critical section at any given time; and using a multithread-lock-unlock module that ensures only one thread on the core of the multi-core processor can access the critical section at a time.

When a currently thread running on the core that is allowed to access the critical section attempts to access the critical section but the currently running thread is not a designated next thread to access the critical section, the currently running thread relinquishes its right to access the critical section on the core that is allowed to access the critical section.

To sum up, among the multiple cores of a multi-core processor of the present invention, only one core is allowed to access the critical section at any given time. Furthermore, when any core is allowed to access the critical section, only one thread is allowed to access the critical section.

Below, the embodiments are described in detail in cooperation with the drawings to make easily understood the technical contents, characteristics and accomplishments of the present invention.

DETAILED DESCRIPTION OF THE INVENTION

Figure 1:
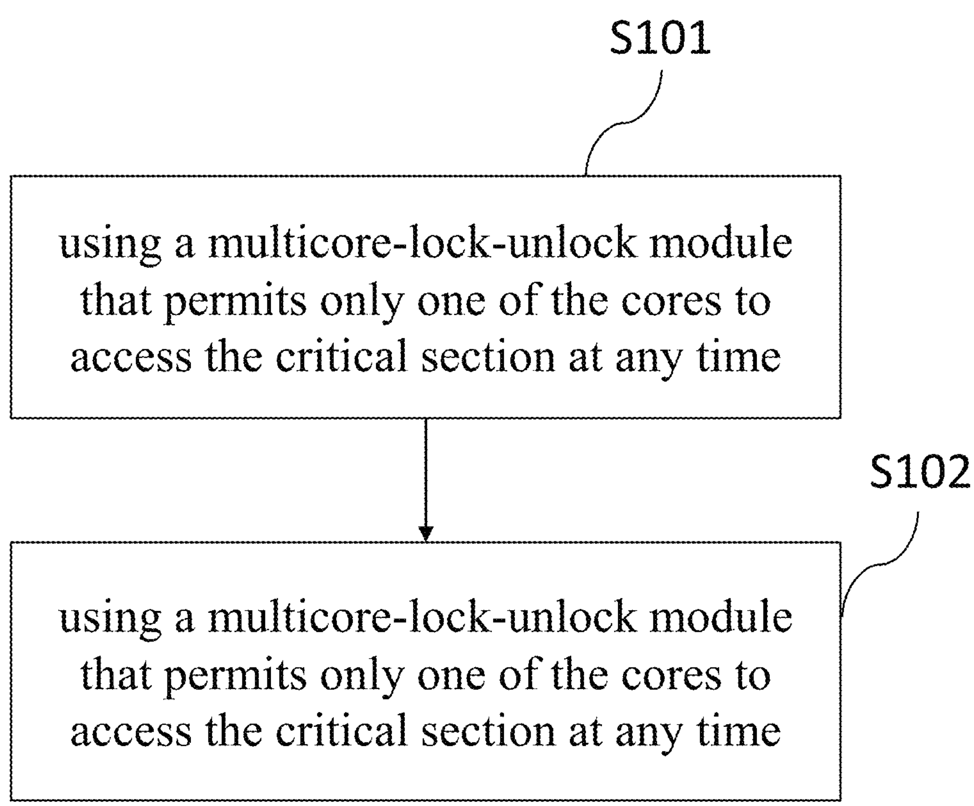
FIG. 1 is a flowchart of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The present invention provides a method for managing mutual exclusion access to a critical section in a multi-core processor that includes multiple cores. Please refer to FIG. 1. The method includes:

S101: using a multicore-lock-unlock module that permits only one of the cores to access the critical section at any time; and

S102: using a multithread-lock-unlock module that ensures only one thread on the core can access the critical section at a time.

In some embodiments of the present invention, comprising establishing the multicore-lock-unlock module and the multithread-lock-unlock module using an algorithm, wherein the multi-core processor performs the algorithm for the multicore-lock-unlock module to permit that only one core of the multi-core processor is allowed to access the critical section at any given time and performs the algorithm for the multithread-lock-unlock module to ensure only one thread on the core of the multi-core processor that is allowed to access the critical section. The algorithm performed by the multi-core processor includes a pre-operation, an access operation, and a leave operation. After completing the pre-operation, the access operation is performed each time a thread requests access to the critical section. The leave operation is performed each time a thread leaves the critical section.

Pre-operation: Setting up data structures, synchronized lock states, and the number of waiting threads associated with the cores and using atomic operations to update the data structure, the number of waiting threads, and the synchronized lock state associated with each core. The synchronized lock state represents either a locked state allowed to access the critical section or an unlocked state waiting to access the critical section. The number of waiting threads represents the number of threads waiting to access the critical section. The data structure represents the order of all threads of the number of waiting threads allowed to enter the critical section.

Access operation: When receiving a thread's request to access the critical section, atomic operations are used to increment the number of waiting threads on the core where the thread is located and to update the synchronized lock state to either the locked state or the unlocked state. At the same time, only one of the synchronized lock states on the cores is the locked state, and when anyone of the cores in the locked state uses the data structure and the number of waiting threads to designate one of all the threads as a next thread to access the critical section.

Leave operation: When a thread leaves the critical section, atomic operations are used to decrement the number of waiting threads on the core where the thread is located and to update the data structure and the synchronized lock state on the core where the thread is located, and according to the updated of the data structure, the synchronization lock status and the number of waiting threads to determine to maintain the locked state of the core where the thread is located or set another of the cores to be allowed to access the critical section. After completing the pre-operation, the access operation is performed each time a thread requests access to the critical section. The leave operation is performed each time a thread leaves the critical section.

To address the issue of over-subscription caused by multiple threads in a multi-core environment, the first embodiment of the present invention provides a solution that ensures fairness (i.e., bounded waiting). In the following description, the solution is referred to as "RON-ticket" in the first embodiment. The data structure is a ticket data structure. The ticket data structure defines an grant variable and a ticket variable for each of the cores. When performing the access operation, the value of the grant variable, the value of the ticket variable, and the number of waiting threads on the core where the thread is located are updated using atomic operations. It is determined to update the synchronized lock state on the core where the thread is located to the locked state or the unlocked state based on a difference between the value of the grant variable and the value of the ticket variable and the number of waiting threads that is zero or greater than zero.

In the first embodiment, the initial value of the grant variable is zero, the initial value of the ticket variable is one, and the initial value of the number of waiting threads that set using atomic operations is zero. In the actual implementation of the present invention, the initial values of the grant variable and the ticket variable can be different. In other words, as long as the value of the ticket variable corresponding to any core can represent the order of threads waiting to access the critical section, and the grant variable corresponding to any core can be compared with the ticket variable of the same core to determine whether the core's synchronized lock state can be set to a locked or an unlocked state, the grant variable and the ticket variable fall within the scope of the present invention. For example, the initial value of the grant variable can be set to one and the initial value of the ticket variable set to two. Alternatively, the grant variable can be set to three and the ticket variable to zero. The subsequent related operations are adaptively modified.

In the implementation of RON-ticket, the algorithm also sets up a waiting array (WaitArray). The number of elements of the waiting array is the same as the number of the cores. Each element of the waiting array represents the ticket variable and the grant variable of each of the cores. The atomic operation updates the value of the ticket variable and the value of the grant variable in the waiting array corresponding to the core where the thread is located. For example, assume that a processor has three cores, where the initial value of the grant variable is zero and the initial value of the ticket variable is one. The ticket data structure of each core of the waiting array is shown as follows:

```
TicketLock WaitArray[3] = {
    {0, 1}, // initial state of TicketLock of core 0
    {0, 1}, // initial state of TicketLock of core 1
    {0, 1}  // initial state of TicketLock of core 2
};
```

The pre-operation further includes respectively setting identifications for the cores and setting up an order array (TSP_ID_ARRAY), where the elements of the order array respectively correspond to transfer orders respectively corresponding to the identifications. The transfer order refers to the priority variable value of each core, which allows a thread to obtain the corresponding priority variable value when requesting access to the critical section. For example, if the order array is {2, 0, 1}, this means that the priority variable values for cores 0, 1, and 2 are defined as 2, 0, and 1, respectively. In other words, the access priority for cores 0, 1, and 2 is mapped to core 2, core 0, and core 1, respectively.

Furthermore, the access operation further includes setting up a locking function that comprises:

- each time a thread requests access to the critical section, the number of waiting threads is incremented using the atomic operation;
- after incrementing the number of waiting threads and when it is determined that the number of waiting threads is zero before incrementing the number of waiting threads, the synchronized lock state corresponding to the core where the thread is located is directly set to the locked state; and
- after incrementing the number of waiting threads and when it is determined that the number of waiting threads is not zero before the incrementing the number of waiting threads, the identification corresponding to the core where the thread is located is obtained using the atomic operation, and the ticket variable in the waiting array corresponding to the identification is updated.

In the embodiment of the RON-ticket, after the locking function updates the ticket variable in the waiting array corresponding to the identification, the locking function further includes setting up an access check loop. The access check loop is used to check whether the current thread enters the critical section. The access check loop includes:

- comparing a difference between the value of the grant variable and the value of the ticket variable in the waiting array of the core where the thread is located to a first preset value;
- when the difference between the value of the grant variable and the value of the ticket variable is equal to the first preset value, the core where the thread is located relinquishes a right to access the critical section, updating the synchronized lock state of the core where the thread is located to the unlocked state;
- when the difference between the value of the grant variable and the value of the ticket variable is not equal to the first preset value, the difference between the value of the grant variable and the value of the ticket variable in the waiting array of the core where the thread is located is compared to a second preset value; and
- when the difference between the value of the grant variable and the value of the ticket variable is equal to the second preset value, the synchronized lock state of the core where the thread is located is updated to the locked state, allowing the thread corresponding to the second preset value that is equal to the difference between the ticket variable value and the grant variable value to be designated as a next thread to access the critical section on the core that is allowed to access the critical section.

Thus, the present invention implements a ticket-based fair lock mechanism with the locking function, ensuring fairness and orderliness when multiple threads access shared resources (i.e., the critical section). By continuously querying (e.g., traveling) and comparing the ticket variable and the grant variable, each core and each thread accesses the critical section according to their obtained ticket sequence, thereby preventing any thread from being denied access to the critical section.

In the embodiment of the RON-ticket, the leave operation further includes setting up an unlocking function that includes:

- using the atomic operation to decrement the number of waiting threads on the core where the thread is located;
- after decrementing the number of waiting threads, determining whether the number of waiting threads on the core where the thread is located is equal to a third preset value; and
- when the number of waiting threads is equal to the third preset value, determining that there is no waiting thread on the core where the thread is located and leaving the unlocking function.

In the embodiment of the RON-ticket, when the number of waiting threads is equal to the third preset value to determine that there is no waiting thread, performing following steps that include:

- setting up a leave check variable, which is used to obtain the next core to be checked based on the transfer order and the identification of the core currently allowed to access the critical section;
- setting up a leave check loop used to search all the cores of the multi-core processor to determine the next thread allowed to enter the critical section, which includes:
- determining whether a difference between the grant variable and the ticket variable in the waiting array corresponding to the core currently checked is equal to a fourth preset value;
- when the difference between the grant variable and the ticket variable in the waiting array corresponding to the core currently checked is equal to the fourth preset value, incrementing the grant variable in the waiting array corresponding to the core currently checked using the atomic operation, then ending the leave check loop, and setting the synchronized lock state on the core currently checked to the locked state; and
- when the core currently checked is in the locked state, using the data structure and the number of waiting threads to designate one of all the threads as a next thread to access the critical section.

In the embodiment of the RON-ticket, after ending the leave check loop, the leave check variable is updated, and the step of updating the leave check variable includes:

- based on the identification of the core currently checked and the transfer order, updating the leave check variable to the identification of the next core to be checked;
- wherein when the leave check variable is the identification of the last core in the transfer order, updating the leave check variable to the identification of the first core in the transfer order.

As described above, when the unlocking function checks whether there are any waiting threads on each core and there are waiting threads on the currently checked core, the current value of the grant variable is updated using atomic operations. Each time a thread leaves the critical section, the unlocking function checks that there are still waiting threads. When the difference between the grant variable and the ticket variable is the second preset value, the grant variable's value is updated using atomic operations to determine whether the next thread is allowed to access the critical section. In other words, the unlocking function uses the number of waiting threads, the ticket variable, and the grant variable to decide the next core and thread that are allowed to access the critical section.

The embodiment of the RON-ticket can be further implemented with the programming codes of C language, as shown below:

```
1 struct TicketLock {grant=0, ticket=1;}
2 atomic_int nWait=0; //per-lock variable
3 TicketLock WaitArray [NUM_CORE]; //per-lock variable
4 TSP_ID=TSP_ID_ARRAY[getcpu( )]
5 void spin_lock( )
6 if(atomic_fetch_add(&nWait, 1)==0) return;
7     1_ticket=atomic_fetch_add(&WaitArray[TSP_ID].ticket, 1);
8 while (1)
9 if(WaitArray[TSP_ID]. grant=1_ticket≠1)
10 sched_yield( );
11 if (1_ticket==WaitArray[TSP_ID]. grant) return;
12 void spin_unlock( )
13 if(atomic_fetch_sub(&nWait, 1)==1) return;
14 next=(TSP_ID+1) % NUM_core;
while (1)
16 if(WaitArray[next]. grant=WaitArray[next].ticket≤−2)
17 atomic_inc(&WaitArray[next]. grant, 1);
18 return;
19 next=(next+1) % NUM_core;
```

The variables of the foregoing codes are described as follows:

(1) NUM_core: This variable represents the total number of cores on the system. It is a system-scope variable.

(2) TSP_ID_ARRAY[ ]: This array stores the mapping of each core ID to its corresponding "TSP ORDER ID" (i.e., TSP_ID), where TSP_ID is the transfer order of the core, used to check whether each core's threads can access the critical section. It is a per-process variable, meaning that each process can have its own routing path (TSP ORDER) because each process can own a different number of cores and can have a different TSP ORDER.

(3) TSP_ID: This is the identification of a core. Each thread runs on one of the cores. Thus, each thread has its corresponding identification. As a result, when a thread accesses TSP_ID, the thread on each core gets the corresponding identification. It is a per-thread variable.

(4) WaitArray[ ]: This array indicates which cores' threads are waiting to access the critical section. When a thread wants to access the critical section, its corresponding WaitArray[TSP_ID] is set to 1. The thread can access the critical section when the corresponding flags inWaitArray[ ] of other threads are set to 0. It is a per-lock array.

In the foregoing codes, each core has a WaitArray composed of elements corresponding to each core. These elements consist of two variables: grant variable and ticket variable. Each core has its own variable for the number of waiting threads (denoted as nWait) (as indicated in lines 1-3 of the codes). When a thread is waiting to access the critical section, it uses an atomic operation (line 6 of the codes) to check whether any thread is already in the critical section. This atomic operation updates the number of waiting threads for the core on which the thread runs. If no thread is in the critical section, the currently waiting thread can access the critical section. To access the critical section, the thread uses an atomic operation to update the ticket variable (line 7 of the codes). Then, the thread waits on the while loop within the locking function (lines 7-10 of the codes) until it is its turn to access the critical section. If the current core's thread is not the next thread to access the critical section, the thread releases the current core's synchronized lock state and retries later (lines 8-11). In other words, if the difference between the grant variable and the ticket variable is not 1 (i.e., when the difference between the values of the grant variable and the ticket variable is the first preset value, which is 1), it means that it is not the current thread's turn to enter the critical section. At this point, the thread should yield the critical section to other threads (via sched yield). If the current thread's ticket variable equals the corresponding core's grant variable (i.e., when the difference between the values of the grant variable and the ticket variable is the second preset value), it means that it is this thread's turn to enter the critical section and the thread proceeds to execute operations within the critical section. When the thread leaves the critical section, the thread executes the unlocking function (void spin_unlock( )) to decrease the variable of the number of waiting threads (line 13 of the codes). If the value of the number of waiting threads nWait before decrementing is 1 (i.e., the third preset value), it is indicated that the current thread is the only one waiting to access the critical section and the function ends after returning (line 13). If there are waiting threads, it searches for a core with a waiting thread (lines 14-19). Once it finds a core with a waiting thread, the condition of WaitArray[next].grant−WaitArray[next].ticket≤−2 (i.e., the fourth preset value) is satisfied. It increments the grant variable of that core by 1, allowing the waiting thread to access the critical section (lines 17-18). If the condition is not satisfied, it updates and continues checking (line 19).

The second embodiment of the present invention is referred to as "RON-Plock" in the following description. The data structure is a spin data structure. The spin data structure includes a number of waiting threads (numWait) and a synchronized lock variable (lock). The number of waiting threads on each core represents the quantity of threads waiting to acquire the permission of the synchronized lock on each core. The initial value of the number of waiting threads is zero (numWait=0). Each core's synchronized lock variable is used to represent that the synchronized lock state of each core is a locked state or an unlocked state. The initial value of the synchronized lock variable represents that each core's synchronized lock state is waiting to access the critical section (lock=MUST_WAIT). That is to say, the initial value of the synchronized lock variable of each core is an unlocked state.

In the embodiment of the RON-Plock, the atomic operation is used to set a Boolean state for the synchronized lock state of each core. The initial value of the Boolean state is set to false, thereby indicating that the synchronized lock state of each core is the unlocked state.

In the embodiment of the RON-Plock, the pre-operation further includes setting up a waiting array. The number of elements of the waiting array is the same as the number of the cores. Each element of the waiting array represents the number of waiting threads and the synchronized lock variable of each of the cores.

Further, the pre-operation further includes setting an identification and a transfer order for each of the cores. The orders of the number of waiting threads and the synchronized lock variable are set for each of the cores of the waiting array based on the identifications and the transfer order.

In the embodiment of the RON-Plock, the access operation includes setting up a locking function, which includes: each time a thread requests access to the critical section, the number of waiting threads in the waiting array corresponding to the core where the thread is located is updated using the atomic operation.

After the locking function updates the number of waiting threads in the waiting array corresponding to the core where the thread is located using the atomic operation, setting up a change loop that includes:

attempting to update the synchronized lock variable of the core where the current thread is located from the unlocked state to the locked state;

when the synchronized lock variable of the core where the current thread is located is successfully updated from the unlocked state to the locked state, it is indicated that the current thread is allowed to access the critical section to leave the locking function.

Furthermore, in the change loop, the locking function uses the atomic operation to attempt to set the core corresponding to the thread from the unlocked state to the locked state using compare-and-exchange. When the core corresponding to the thread is successfully set from the unlocked state to the locked state using compare-and-exchange, the thread is allowed to access the critical section. Then, the thread leaves the locking function.

Further, when the locking function does not use the atomic operation to set the core corresponding to the thread from the unlocked state to the locked state in the change loop using compare-and-exchange, it is indicated that the current thread is not allowed to access the critical section. That is to say, the current thread relinquishes its right to access the critical section on the core that is allowed to access the critical section. Then, the following step are performed:

- attempting to use atomic operations (such as compare-and-exchange atomic operations) to set the Boolean state from false to true;
- when the Boolean state is updated from false to true, it is indicated that the synchronized lock state on the core where the current thread is located is allowed to be set to the locked state, thereby allowing the current thread to be the next thread to access the critical section, and then leaving the change loop;
- when the Boolean state is not updated from false to true, returning to the step of determining whether the atomic operation updates the Boolean state from false to true in the change loop.

In the RON-Plock, the leave operation further includes setting up an unlocking function that includes using an atomic operation to decrement the number of waiting threads in the waiting array of the core where the current thread is located and setting up a check loop. The check loop includes:

- sequentially checking whether the number of waiting threads in the waiting array of each of the cores is equal to a fifth preset value;
- when the number of waiting threads in the waiting array of the core currently checked is equal to the fifth preset value, using the atomic operation to update the synchronized lock state of the waiting array of the core currently checked to the locked state; and
- when the synchronized lock state of the waiting array of the core currently checked is updated to the locked state, designating the next thread to access the critical section on the core currently checked and then leaving the unlocking function;
- when the number of waiting threads in the waiting array of the core currently checked is not equal to the fifth preset value, it is indicated that there are currently no thread and the Boolean state is set to false to indicate that the synchronized lock state of each of the cores is the unlocked state.

The RON-Plock can be further implemented with the programming codes of C language, as shown below:

```
1 struct PLock {numWait=0, lock=MUST_WAIT;}
2 atomic_bool InUse=false; //per-lock variable
3 PLock WaitArray[NUM_core]; //per-lock variable
4 void lock( )
atomic_inc(&WaitArray[TSP_ID]. numWait);
6 while (1)
7 if (cmpxchg(&WaitArray[TSP_ID]. lock, HAS_LOCK, MUST_WAIT))
8 return;
9 if (cmpxchg(&InUse, false, true))
10 return;
11 void unlock( )
12 atomic_dec(&WaitArray[TSP_ID]. numWait);
13 for(int i=1; i<NUM_core+1; i++)
14 if(WaitArray[(TSP_ID+i) % NUM_core]. numWait>0)
15 WaitArray[(TSP_ID+i) % NUM_core]=HAS_LOCK;
16 return;
17 InUse=false;
```

The variables in the foregoing codes are similar to those in the RON-ticket embodiment. The following description explains the variables not used in RON-ticket:

InUse: This Boolean state represents the synchronized lock state of each core. If the variable is "false," it indicates that no thread is in the critical section. Conversely, if the variable is "true," it indicates that a thread is in the critical section. This is a per-lock variable.

In the foregoing codes, each element of the waiting array corresponds to each core and consists of two variables: the number of waiting threads (numWait) and the synchronized lock variable (lock). When any thread wants to access the critical section, it must use an atomic operation (atomic_inc( ) to set the number of waiting threads (numWait) for the core to which the current thread belongs. When the synchronized lock variable of a core can be changed from an unlocked state to a locked state (HAS_LOCK) using an atomic operation, the thread currently executing on that core can access the critical section (i.e., lines 7-8 of C codes for the RON-Plock). An atomic operation is reused to attempt to set the Boolean state of the synchronized lock state. If the Boolean state of the synchronized lock state was originally false, it is indicated that the lock is not occupied. If the Boolean state is set to true, it is indicated that the critical section is now occupied by the current thread and the critical section leaves the lock function (i.e., lines 9-10 of C codes for the RON-Plock). Furthermore, lines 9-10 of the algorithm perform an additional check to see the Boolean status of the synchronized lock state. If the Boolean status of the synchronized lock state can be successfully set from false to true, it is indicated that no other thread among all cores is currently accessing or trying to access the critical section, allowing the current thread to safely access the critical section. This is a strategy to ensure that another method can still determine whether the critical section can be accessed even if the synchronized lock state on the specific core cannot be directly set to a locked state.

The void unlock( ) defines the unlocking function (i.e., line 11 of C codes for the RON-Plock). The purpose of the unlocking function is to release the synchronized lock state held by the current thread to an unlocked state and to attempt to pass the opportunity to other threads waiting to access the critical section. This is done by reducing the number of waiting threads on the current core (designated by TSP_ID) using an atomic operation. This indicates that the current thread no longer needs to be in the locked state, thereby reducing the waiting number (i.e., line 12 of C codes for the RON-Plock). Afterward, the loop travels through all the cores, tries to find the next thread that needs to obtain the locked state (i.e., line 13 of C codes for the RON-Plock), and checks whether there are any waiting threads on each core. If there are threads that are waiting (i.e., if numWait is greater than 0), it proceeds to the next operation (i.e., line 14 of C codes for the RON-Plock). The first core found with waiting threads is set to the locked state, meaning that the synchronized lock variable of this core can be set to the locked state and that the waiting thread on this core is allowed to access the critical section (i.e., line 15 of C codes for the RON-Plock). The function then exits (i.e., line 16 of C codes for the RON-Plock). Setting InUse to false indicates that no thread is currently using the critical section, thus allowing other threads to attempt to access the critical section.

To compare the performance of the present invention with other methods, the RON-Ticket and RON-Plock embodiments are further compared with existing methods:

In the performance evaluation experiments, we used an AMD Threadripper 2990WX equipped with 64 cores (32 physical cores) and the GNU/Linux operating system. The kernel version was 5.4. The compiler used was gcc-9.3, with optimization parameters set to "–march=znver1–O3," enabling gcc-9.3 to optimize for the Threadripper microarchitecture. All experiments were conducted 100 times and the results were averaged. The AMD Threadripper is a chip-NUMA. The chip has four modules. Each module has two core complexes (CPU Complex, CCX). Each CCX has four cores. Additionally, the Linux numastat command shows that the 2990WX has four NUMA nodes. The cache coherence protocol operates at the cache line granularity, meaning low latency also implies high bandwidth. Therefore, the transmission latency obtained from the experiments not only provides information for the design of inter-core locking algorithms but also offers insights into the performance characteristics of the underlying hardware. By profiling inter-core latency, an operating system can optimize lock-unlock algorithms accordingly. Moreover, detailed microarchitecture information about the NoC from CPU vendors can lead to even better performance. The source code mentioned in the invention can be found at https://github.com/shiwulo/ron-osdi2023. To compare with other methods more comprehensively, we used the LiTL (Library for Transparent Lock interposition) framework (refer to DOI: https://doi.org/10.1145/3301501). By using LD_PRELOAD, RON-ticket, or RON-Plock, the invention can be compared with other methods in different benchmarks. The following description stated the performance characteristics of each traditional algorithm rather than the implementation details.

1. Plock (see https://doi.org/10.1109/71.80120): The GNU Pthread's spinlock. A thread that intends to enter a critical section will test the synchronized lock until its value equals to 0. When a thread leaves a critical section, it sets the synchronized lock to 0. The first core that observes that the synchronized lock is 0 can enter the critical section. The closer to the core the synchronized lock is released, the more likely it is for the core to enter the critical section.
2. Ticke (see https://doi.org/10.1145/359060.359076): This method allows each task waiting to enter the critical section to have a "ticket" number. The thread waits until the "grant" is equal to its ticket number. The wait loops of all waiting threads use atomic instructions to continually query the value of the "grant", which consumes limited NoC bandwidth.
3. MCS (see https://doi.org/10.1145/103727.103729): Because all tasks waiting to enter the critical section are queued in a linked list, when a thread leaves the critical section, it only needs to set the "wait flag" of the next task to false. Setting the wait flag of next thread is more efficient than multicasting when the CPU supports a directory cache coherence algorithm. MCS does not optimize the interconnect latency in multi-core architectures.
4. C-BO-MCS (see https://doi.org/10.1145/2686884): The thread should first acquire the MCS lock of the NUMA node to which the thread belongs. Then, it must compete with threads on other NUMA nodes to obtain a back-off lock. If a core neighbors to the core that obtains the C-BO-MCS lock, it has a higher priority to enter the critical section. With this method, threads belonging to the same node can be grouped together to reduce handover costs.
5. ShflLock (see https://doi.org/10.1145/3341301.3359629): This also uses grouping to improve performance. Shuffle can specify that a thread in the queue is responsible for shuffling. However, when the task that is allowed to enter the critical section is shuffling the queue, the thread cannot enter the critical section immediately and system performance may decrease.

The compared experiments analyzed each method in a quantitative manner through a controllable microbenchmark. In each set of experiments, each thread is bound (i.e., sched_setaffinity( )) to a hardware thread and executes each method. The testing codes are shown as follows:

```
1 void thread ( ):
2 while (1):
3 spin_lock( ); //LS
4 for (each element in SharedData): //CS
5 element=element+1; //CS
6 spin_unlock( ); //US
7 t=clock_gettime( ); //nCS
8//syscall overhead, rdtscp implement in userspace
9 while (clock_gettime( )–t>nCS_size*rand(0.85~1.15));
```

Because we have SMT (Simultaneous multi-threading) enabled, there are 2 hardware threads per core. The total number of software threads is 64. In the while loop (lines 2-9 of testing codes) of the testing algorithm, a thread in the lock section (LS) (line 3 of testing codes) requests entry into the critical section (lines 4-5 of testing codes). After the thread enters the critical section, each entry in SharedData is read and written, and the lock is released into the unlock section (US) (line 6 of testing codes) when the thread leaves the critical section. The clock_gettime( ), defined in the POSIX.1-2001 standard, is called in the non-critical section (nCS) (lines 7-9 of testing codes) until the elapsed time of the nCS exceeds the value of nCS_size±15%.

In each set of experiments of this section, each thread binds (i.e., sched_setaffinity( )) to a core and executes the testing algorithm. Each core has at most [num_thread÷num_core] threads. Because RON-ticket shares a key property with RON, that is, bounded waiting. In the experiment, microbenchmarks are used to evaluate the performance of RON-ticket and RON-plock. In the case of oversubscription, two factors affect performance. The first one is whether the thread holding the lock is scheduled out. Second, if the algorithm specifies the next thread entering the CS, and whether it is scheduled out.

Figure 2:
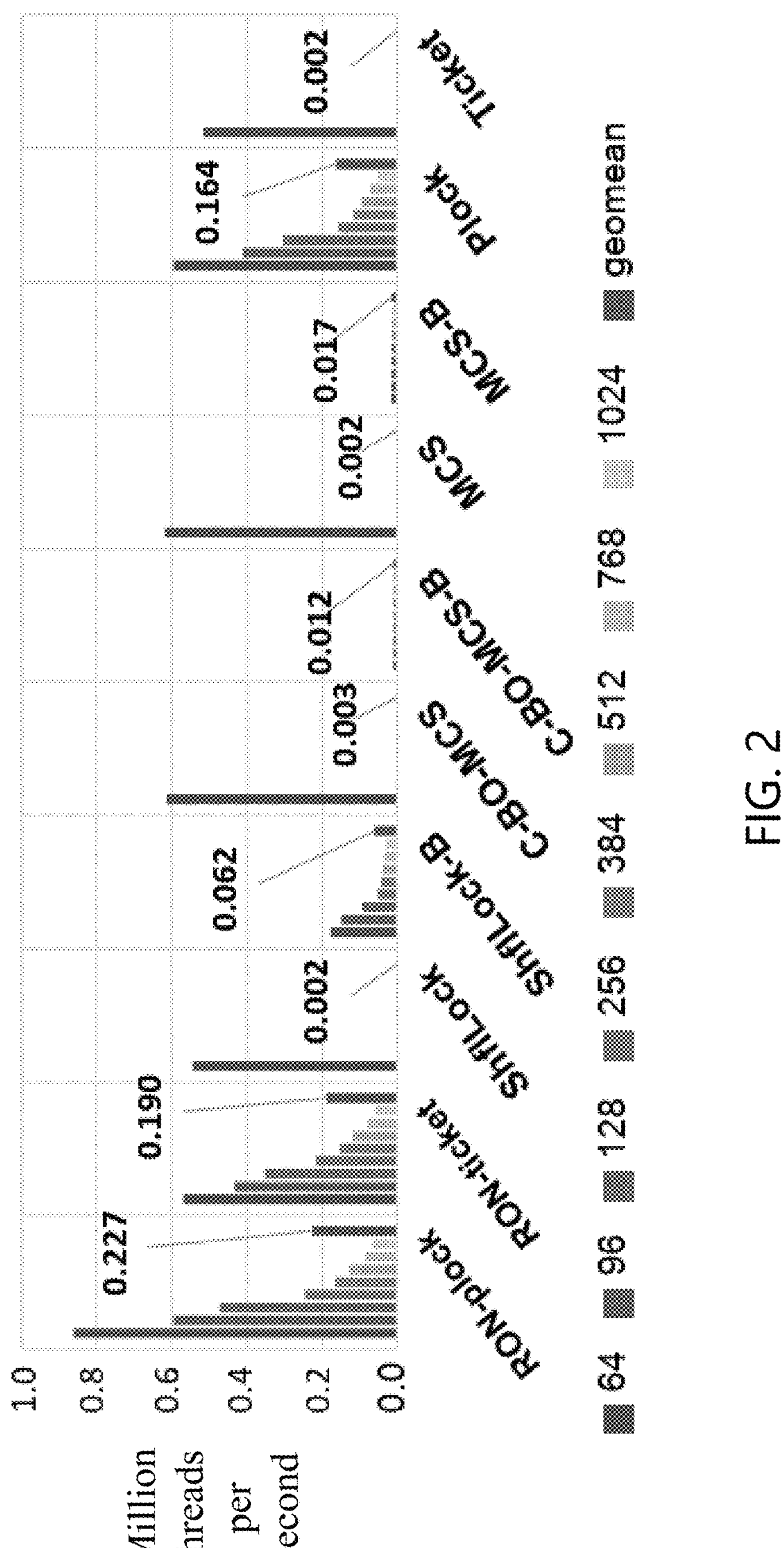
FIG. 2 is a schematic diagram illustrating the performance comparison of the present invention and the conventional method under oversubscribe.

In FIG. 2, RON-plock and RON-ticket perform better in the case of overbooking, where the y-axis denotes "millions locks" per second (million threads per second are set to 1.0). Although C-BO-MCS(-B) and ShflLock(-B) also support oversubscription, the number of lock-unlock operations per second is dropped quickly.

RON-plock and Plock use intuitive methods (e.g., test-test-and-set) to solve the problem of oversubscribe. As long as the lock-holder is not scheduled out, Plock will allow a thread to enter critical section (it is because that all threads wait on the same variable.). RON-plock is similar to Plock, except that all threads on the next core are scheduled out. Because RON-plock is based on RON, the performance of RON-plock is better than Plock. RON-ticket, ShflLock-B, and C-BO-MCS-B use system calls (i.e., futex( ) and yield( ) to prevent the thread from spinning meaninglessly. ShflLock-B's unlock( ) directly wakes up the next thread. However, C-BO-MCS-B's unlock( ) may wake up all threads that can enter critical section. RON-ticket makes the next thread that can enter the CS busy waiting, and other threads on that core enter the sleep state. For the same reason as RON-plock, RON-ticket has better performance.

We investigate how algorithm performance changes with an increase in the number of threads used. Our experiment was conducted on the 2990WX, which has SMT technology.

During the experiment, each thread accesses 100 integers in the critical section, while the non-critical section takes 10,000±15% nanoseconds.

Figure 3:
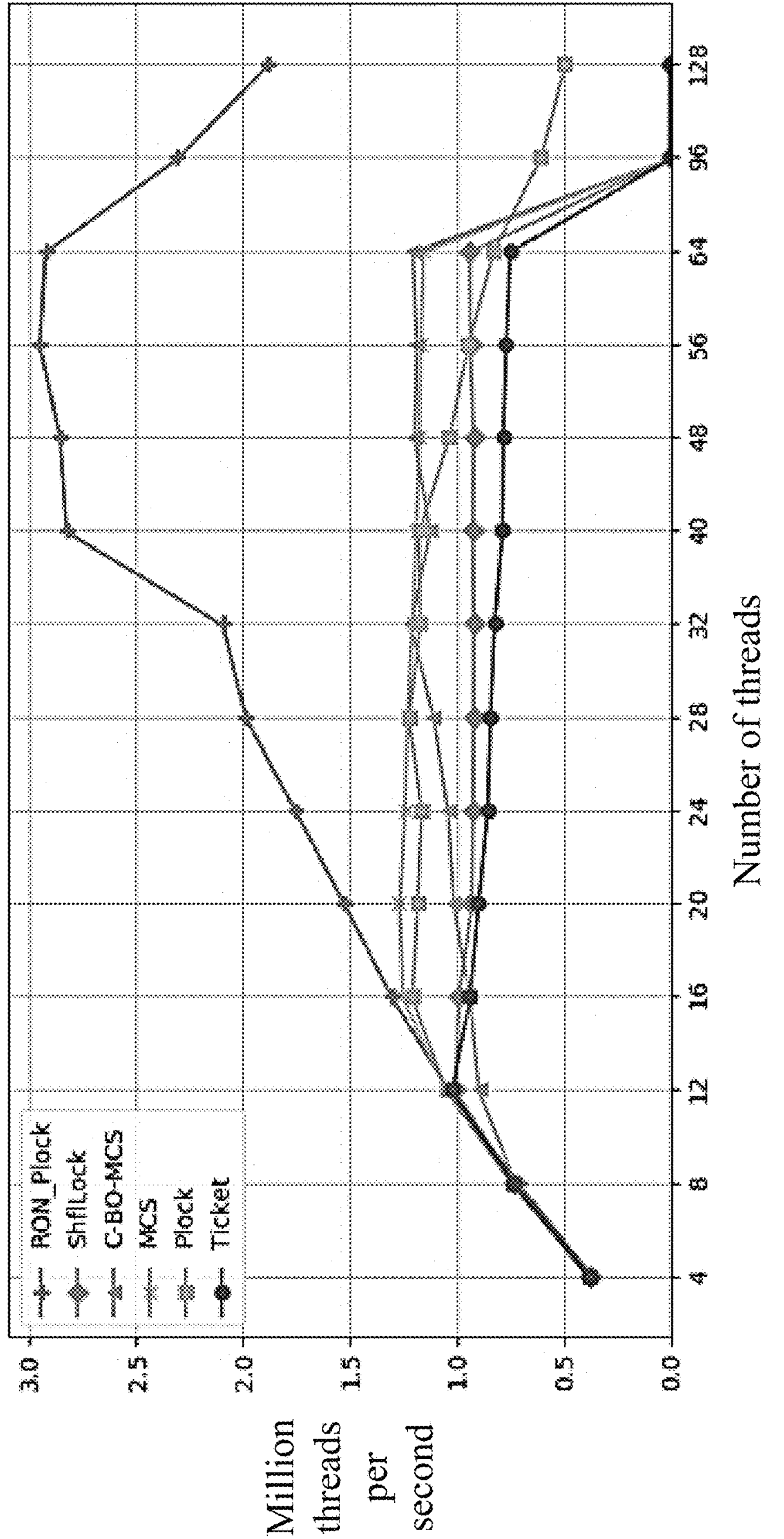
FIG. 3 is a schematic diagram illustrating the comparison of the number of accessing a locked state per second of the present invention and the conventional method under different number of threads.

As shown in FIG. 3, it indicates that the performance of the RON-plock improves with an increase in the number of threads when the thread count is less than 64. In this experiment, "executing more threads simultaneously" and "having shorter non-critical sections" both lead to greater competition for entering the critical section. However, when the number of threads exceeds 64, the performance of these algorithms is determined by their ability to handle the oversubscribe problem.

We pick five different application-level benchmarks representing different performance bottlenecks. For the consistency of the experiment, the RON implementation here uses RON-ticket, which is compared with other conventional methods.

Figure 4:
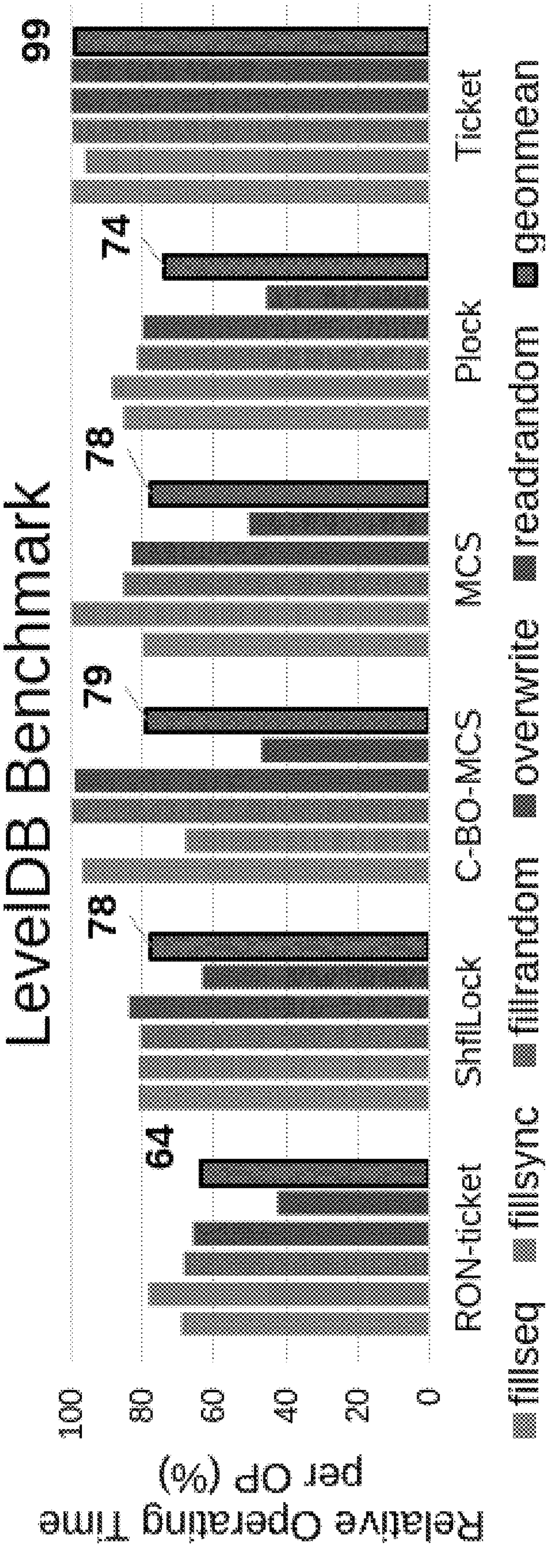
FIG. 4 is a schematic diagram illustrating the performance comparison of using Google's LevelDB to test spin locks of the present invention and the conventional method.

Here, we used Google's LevelDB to test the performance of the spinlock. The Horizontal axis of FIG. 4 is the algorithm tested, and the vertical axis is the time cost for every operation reported by LevelDB. Because of the difference data scales, "fillsync" is normalized to MCS and others normalized to Ticket.

We use the db_bench in LevelDB to evaluate performance with 1 million entries and 64 threads. For each spinlock, fillseq, fillsync, fillrandom, overwrite, and readrandom have been tested. The last one is the geometric average of Lev-elDB's 5 tests. RON-ticket, ShflLock and C-BO-MCS are spin locks optimized for ccNUMA or NUMA. Please note that RON-ticket is RON with oversubscribe support and it also satisfies bounded waiting. In FIG. 4, compared with ShflLock and C-BO-MCS, the performance of RON-ticket is better by 22.1% and 24.2%, respectively.

Benchmarks in Different Contention Levels

Figure 5:
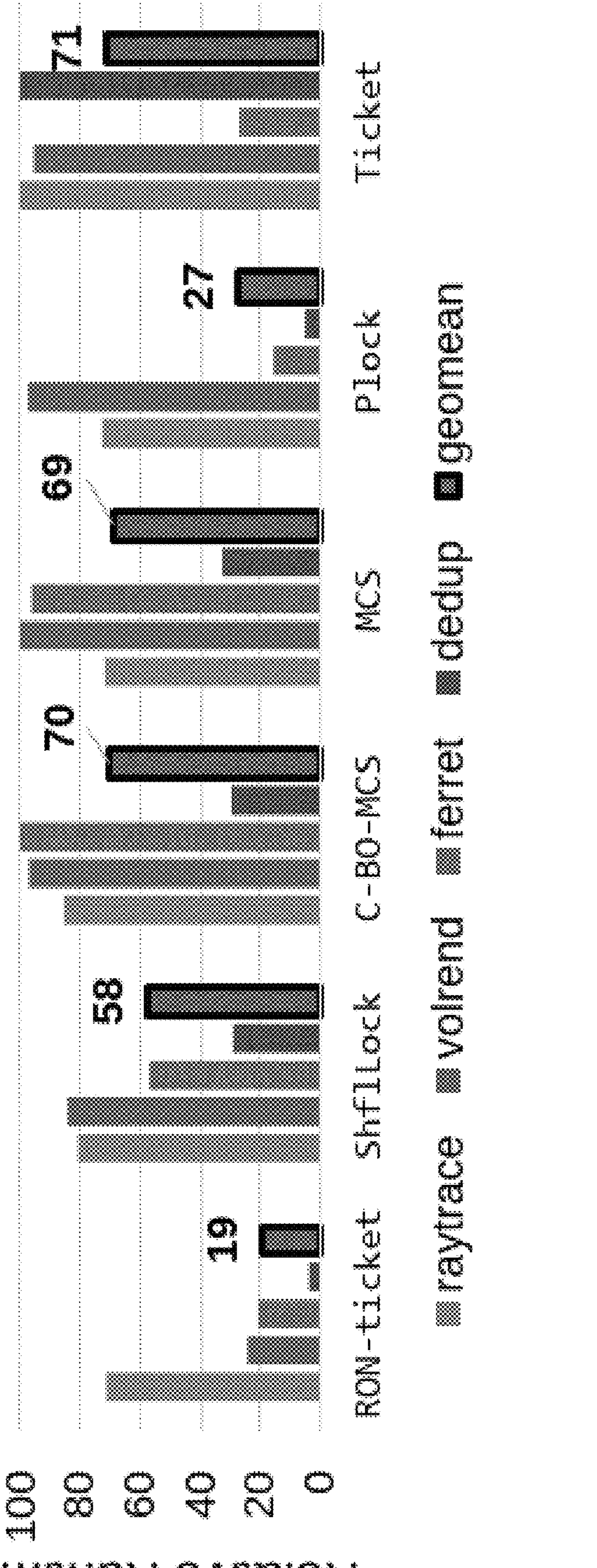
FIG. 5 is a schematic diagram illustrating the performance comparison of applications with different contention level of the present invention.

We applied an additional four different application benchmarks to evaluate the performance of different algorithms. These algorithms are selected from LiTL (DOI; https://doi.org/10.1145/3301501) and cover both high and low contention scenarios. Volrend and Raytrace are from the SPLASH2x benchmark set representing extreme and high levels of contention, respectively. For the extreme level, more than 40 threads are waiting to acquire the same lock instance. For the high level, there are about 10 to 40 threads waiting to acquire a lock. Dedup and Ferret are from the PARSEC3.0 benchmark set and respectively represent pressure on the memory and relatively low levels of contention. In FIG. 5, the vertical axis is the elapsed time of the benchmark task (including geomean of LevelDB FIG. 4). Because of the different data scales, the numbers are the percentage to where the algorithm performs the worst for each task.

The bottleneck of Raytrace is a lock contention, protecting a single counter with about a million acquisitions every second. RON-ticket, MCS, and Plock accomplished the task with around 70% of elapsed time. MCS is optimized for multi-core systems with dedicated caches for each core to reduce the overhead of lock contention and well fitted in high level of contention. The code of Plock is not optimized for multi-core. However, the core adjacent to the core that released the lock is more likely to successfully perform the atomic operation compare_exchange( ) to acquire the lock. Thus, Plock is implicitly optimized for multi-core platforms.

In the case of extreme levels of contention, the performance of Plock and MCS starts to drop while the ShflLock and RON-ticket can handle the stress. Under extreme level of contention (Volrend), RON-ticket achieved its best performance, taking only 24.3% of the elapsed time of the ticket to accomplish task. The bottleneck of Volrend is the lock contention for protecting different task queues with around 40 threads waiting. This benchmark verified that the RON algorithm generally performs best under higher contention. With more cores possessed by threads spinning for the lock instance, the routing path can massively reduce the handover cost.

However, under low levels of contention, RON-ticket only performs second best in all six algorithms. Ferret is a parallelized software with about 2000 times of acquisition for every second. While RON-ticket uses around 20% of the elapsed time, Plock takes only around 15.6% of the elapsed time of C-BO-MCS, outperforming RON in this specific benchmark. The lower contention of the lock leads to the sparseness of the WaitArray, which results in leaping on the routing path and lowers the benefit. Ticket guarantees fairness as threads keeping querying the global variable to know whether they can enter the CS. Ticket fits the task with low level of contention. However, under higher pressure, the bandwidth consumed by lock contention limits the bandwidth that can be used by handover.

Moreover, according to the results of Dedup, RON-ticket and Plock gave low memory pressure. Dedup allocates numerous locks (266 k), which puts pressure on the memory if the components of the lock are not reusable. The reusability of components like WaitArray and Get_TSP_ID gives RON-ticket the ability to handle numerous lock allocations.

Finally, the present invention also references the journal paper "RON: One-Way Circular Shortest Routing to Achieve Efficient and Bounded-waiting Spinlocks" (public URL: https://www.usenix.org/conference/osdi23/presentation/lo). It is particularly noted here that the first author of this journal paper is the inventor of this patent application. All algorithms and ideas were invented by the first author who has made the entire contribution to this patent application. The other authors only performed experiments, guided the experiments, or revised the article content, and did not provide any contributions to the invention.

As mentioned above, both embodiments of the present invention use atomic operations (such as atomic_fetch_add, atomic_inc, atomic_dec, and cmpxchg) to ensure safe variable reading and modification in a multi-threaded environment. These atomic operations ensure data consistency and system stability, preventing problems with data contention and condition contention. They both achieve lock control for specific cores of multi-core processors. Using the WaitArray array, each core has its corresponding lock state management (TicketLock or PLock structure), allowing more refined management of the synchronized lock acquisition behavior of threads on each core.

Additionally, in the invention, when a thread is unable to immediately acquire the lock to access the critical section, a waiting mechanism is implemented. The RON-ticket uses the sched_yield( ) function to yield the CPU time. The RON-Plock implements waiting through loop wait (while (1)) and condition checks (cmpxchg operations). Both algorithms include management of lock states (such as MUST_WAIT, HAS_LOCK, and InUse) to indicate whether the synchronized lock is available and whether any thread is in the critical section. Managing these states is crucial for ensuring the correct acquisition and release of the synchronized lock. When a thread releases the synchronized lock, both embodiments of the invention implement mechanisms to dynamically adjust the lock state so that other waiting threads can access the critical section in order. The RON-ticket implements the mechanisms by updating the grant value. The RON-Plock implements the mechanisms by changing the lock state and the InUse flag.

In conclusion, the common technical features of RON-ticket and RON-Plock include the application of atomic operations, core-oriented synchronized lock control, the implementation of waiting mechanisms, the management of synchronized lock states, and dynamic adjustment mechanisms for synchronized locks. These features together form the foundation for synchronizing multiple threads and accessing a critical section on a multi-core processor.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for managing mutual exclusion access to a critical section in a multi-core processor, the multi-core processor processing managing steps comprising:

using a multicore-lock-unlock module that permits only one core of the multi-core processor to access a critical section at any given time; and using a multithread-lock-unlock module that ensures only one thread on the core of the multi-core processor can access the critical section at a time, wherein, when the thread currently running on the core that is allowed to access the critical section attempts to access the critical section but the currently running thread is not the designated next thread to access the critical section, the currently running thread relinquishes its right to access the critical section on the core that is allowed to access the critical section;

wherein the multicore-lock-unlock module and the multithread-lock-unlock module are established using an algorithm, and the multi-core processor performs the algorithm to permit only one core of the multi-core processor to access the critical section at any given time and to ensure only one thread on the core of the multi-core processor that is allowed to access the critical section, and the algorithm includes the following operations:

a pre-operation: setting up data structures, synchronized lock states, and number of waiting threads associated with the cores, and using atomic operations to update the data structure, the number of waiting threads, and the synchronized lock states on each of the cores, wherein the synchronized lock state on each of the cores represents either a locked state allowed to access the critical section or an unlocked state waiting to access the critical section, the number of waiting threads on each of the cores represents number of threads waiting to access the critical section, and each of the data structures represents an order of all threads of the number of waiting threads allowed to enter the critical section, an access operation: when receiving a thread's request to access the critical section, atomic operations are used to increment the number of waiting threads on the core where the thread is located and to update the synchronized lock state to either the locked state or the unlocked state, and at the same time, only one of the synchronized lock states on the cores is the locked state, and when anyone of the cores in the locked state uses the data structure and the number of waiting threads to designate one of all the threads as the next thread to access the critical section, and a leave operation: when the thread leaves the critical section, atomic operations are used to decrement the number of waiting threads on the core where the thread is located and to update the data structure and the synchronized lock state on the core where the thread is located, and according to the updated data structure, the synchronization lock status and the number of waiting threads to determine to maintain the locked state of the core where the thread is located or set another of the cores to be allowed to access the critical section;

wherein, after completing the pre-operation, the access operation is performed each time the thread requests access to the critical section, and the leave operation is performed each time the thread leaves the critical section.

2. The method for managing mutual exclusion access to the critical section in the multi-core processor according to claim 1, wherein the data structure is a ticket data structure, the ticket data structure defines a grant variable and a ticket variable for each of the cores, when performing the access operation, a value of the grant variable, and a value of the ticket variable, and the number of waiting threads on the core where the thread is located are updated using atomic operations, and it is determined to update the synchronized lock state on the core where the thread is located to the locked state or the unlocked state based on a difference between the updated of the value of the grant variable and the value of the ticket variable and the number of waiting threads that is zero or greater than zero.

3. The method for managing mutual exclusion access to the critical section in the multi-core processor according to claim 2, wherein the pre-operation further comprises:

setting up a waiting array, where number of elements of the waiting array is the same as number of the cores, each element of the waiting array represents the ticket variable and the grant variable of each of the cores, and the atomic operation updates the value of the ticket variable and the value of the grant variable in the waiting array corresponding to the core where the thread is located.

4. The method for managing mutual exclusion access to the critical section in the multi-core processor according to claim 3, wherein the pre-operation further comprises:

respectively setting identifications for the cores; and setting up an order array, where elements of the order array are respectively transfer orders respectively corresponding to the identifications.

5. The method for managing mutual exclusion access to the critical section in the multi-core processor according to claim 4, wherein the access operation further comprises:

setting up a locking function that comprises:

each time the thread requests access to the critical section, the number of waiting threads is incremented using the atomic operation;

after incrementing the number of waiting threads and when it is determined that the number of waiting threads is zero before incrementing the number of waiting threads, the synchronized lock state corresponding to the core where the thread is located is directly set to the locked state; and after incrementing the number of waiting threads and when it is determined that the number of waiting threads is not zero before incrementing the number of waiting threads, the identification corresponding to the core where the thread is located is obtained using the atomic operation, and the ticket variable in the waiting array corresponding to the identification is updated.

6. The method for managing mutual exclusion access to the critical section in the multi-core processor according to claim 5, wherein the locking function, after updating the ticket variable in the waiting array corresponding to the identification, further comprises:

setting up an access check loop, which is used to check whether the current thread enters the critical section, and the access check loop comprises:

comparing a difference between the value of the grant variable and the value of the ticket variable in the waiting array of the core where the thread is located to a first preset value;

when the difference between the value of the grant variable and the value of the ticket variable is equal to the first preset value, the core where the thread is located relinquishes a right to access the critical section, updating the synchronized lock state of the core where the thread is located to the unlocked state;

when the difference between the value of the grant variable and the value of the ticket variable is not equal to the first preset value, the difference between the value of the grant variable and the value of the ticket variable in the waiting array of the core where the thread is located is compared to a second preset value; and when the difference between the value of the grant variable and the value of the ticket variable is equal to the second preset value, the synchronized lock state of the core where the thread is located is updated to the locked state, allowing the thread corresponding to the second preset value that is equal to the difference between the ticket variable value and the grant variable value to be designated as the next thread to access the critical section on the core that is allowed to access the critical section.

7. The method for managing mutual exclusion access to the critical section in the multi-core processor according to claim 4, wherein the leave operation further comprises:

setting up an unlocking function that comprises:

using the atomic operation to decrement the number of waiting threads on the core where the thread is located;

after decrementing the number of waiting threads, determining whether the number of waiting threads on the core where the thread is located is equal to a third preset value; and when the number of waiting threads is equal to the third preset value, determining that there is no waiting thread on the core where the thread is located and leaving the unlocking function.

8. The method for managing mutual exclusion access to the critical section in the multi-core processor according to claim 7, wherein when the number of waiting threads is equal to the third preset value to determine that there is no waiting thread, performing following steps that comprise:

setting up a leave check variable, which is used to obtain the next core to be checked based on the transfer order and the identification of the core currently allowed to access the critical section;

setting up a leave check loop used to search all the cores of the multi-core processor to determine the next thread allowed to enter the critical section, which comprises:

determining whether a difference between the grant variable and the ticket variable in the waiting array corresponding to the core currently checked is equal to a fourth preset value;

when the difference between the grant variable and the ticket variable in the waiting array corresponding to the core currently checked is equal to the fourth preset value, incrementing the grant variable in the waiting array corresponding to the core currently checked using the atomic operation, then ending the leave check loop, and setting the synchronized lock state on the core currently checked to the locked state; and when the core currently checked is in the locked state, using the data structure and the number of waiting threads to designate one of all the threads as the next thread to access the critical section.

9. The method for managing mutual exclusion access to the critical section in the multi-core processor according to claim 8, wherein after ending the leave check loop, the leave check variable is updated, and the step of updating the leave check variable comprises:

based on the identification of the core currently checked and the transfer order, updating the leave check variable to the identification of the next core to be checked;

wherein when the leave check variable is the identification of the last core in the transfer order, updating the leave check variable to the identification of the first core in the transfer order.

10. The method for managing mutual exclusion access to the critical section in the multi-core processor according to claim 1, wherein the data structure is a spin data structure, which comprises number of waiting threads and a synchronized lock variable, the number of waiting threads on each of the cores represents number of threads waiting to access the critical section, the synchronized lock variable of each of the cores represents either the locked state or the unlocked state as the synchronized lock state of each of the cores, an initial value of the number of waiting threads is zero, and an initial value of the synchronized lock variable of each of the cores is the unlocked state.

11. The method for managing mutual exclusion access to the critical section in the multi-core processor according to claim 10, wherein the pre-operation further comprises:

using the atomic operation to set a Boolean state for the synchronized lock state of each core; and setting an initial value of the Boolean state to false, thereby indicating that the synchronized lock state of each of the cores is the unlocked state.

12. The method for managing mutual exclusion access to the critical section in the multi-core processor according to claim 11, wherein the pre-operation further comprises:

setting up a waiting array, where number of elements of the waiting array is the same as number of the cores, each element of the waiting array represents the number of waiting threads and the synchronized lock variable of each of the cores.

13. The method for managing mutual exclusion access to the critical section in the multi-core processor according to claim 12, wherein the pre-operation further comprises:

setting an identification and a transfer order for each of the cores; and setting orders of the number of waiting threads and the synchronized lock variable for each of the cores of the waiting array based on the identifications and the transfer order.

14. The method for managing mutual exclusion access to the critical section in the multi-core processor according to claim 13, wherein the access operation comprises:

setting up a locking function, which comprises:

each time the thread requests access to the critical section, the number of waiting threads in the waiting array corresponding to the core where the thread is located is updated using the atomic operation.

15. The method for managing mutual exclusion access to the critical section in the multi-core processor according to claim 14, wherein after the locking function updates the number of waiting threads in the waiting array corresponding to the core where the thread is located using the atomic operation, setting up a change loop that comprises:

attempting to update the synchronized lock variable of the core where the current thread is located from the unlocked state to the locked state;

when the synchronized lock variable of the core where the current thread is located is successfully updated from the unlocked state to the locked state, it is indicated that the current thread is the next thread to access the critical section to leave the locking function.

16. The method for managing mutual exclusion access to the critical section in the multi-core processor according to claim 15, wherein when the synchronized lock variable of the core where the current thread is located is not be updated from the unlocked state to the locked state, it is indicated that the current thread is not allowed to access the critical section, the current thread relinquishes its right to access the critical section on the core that is allowed to access the critical section and then following steps are performed:

determining whether the atomic operation updates the Boolean state from false to true; and when the Boolean state is updated from false to true, it is indicated that the synchronized lock state on the core where the current thread is located is allowed to be set to the locked state, thereby allowing the current thread to be the next thread to access the critical section, and then leaving the change loop.

17. The method for managing mutual exclusion access to the critical section in the multi-core processor according to claim 16, wherein when the Boolean state is not updated from false to true, returning to the step of determining whether the atomic operation updates the Boolean state from false to true.

18. The method for managing mutual exclusion access to the critical section in the multi-core processor according to claim 13, wherein the leave operation further comprises setting up an unlocking function that comprises:

using an atomic operation to decrement the number of waiting threads in the waiting array of the core where the current thread is located;

setting up a check loop that comprises:

sequentially checking whether the number of waiting threads in the waiting array of each of the cores is equal to a fifth preset value;

when the number of waiting threads in the waiting array of the core currently checked is equal to the fifth preset value, using the atomic operation to update the synchronized lock state of the waiting array of the core currently checked to the locked state; and when the synchronized lock state of the waiting array of the core currently checked is updated to the locked state, designating the next thread to access the critical section on the core currently checked and then leaving the unlocking function.

19. The method for managing mutual exclusion access to the critical section in the multi-core processor according to claim 18, wherein when the number of waiting threads in the waiting array of the core currently checked is not equal to the fifth preset value, it is indicated that there are currently no thread and the Boolean state is set to false to indicate that the synchronized lock state of each of the cores is the unlocked state.

* * * * *